(12) United States Patent
Maesaka et al.

(10) Patent No.: US 7,120,663 B2
(45) Date of Patent: Oct. 10, 2006

(54) METHOD AND APPARATUS FOR UPDATING XML DATA

(75) Inventors: Hiroshi Maesaka, Tokyo (JP);
Ryuuichi Tamano, Tokyo (JP);
Hisanobu Nishidori, Hyogo (JP)

(73) Assignee: NEC Corporation, Tokyo (JP)

( * ) Notice: Subject to any disclaimer, the term of this patent is extended or adjusted under 35 U.S.C. 154(b) by 728 days.

(21) Appl. No.: 09/969,752

(22) Filed: Oct. 4, 2001

(65) Prior Publication Data
US 2002/0045951 A1   Apr. 18, 2002

(30) Foreign Application Priority Data
Oct. 13, 2000   (JP)   ............... 2000-313438

(51) Int. Cl.
G06F 15/16 (2006.01)
G06F 7/00 (2006.01)
G06F 15/00 (2006.01)

(52) U.S. Cl. .............. 709/203; 709/217; 707/10; 707/104.1; 715/513

(58) Field of Classification Search .............. 709/206, 709/203, 216–222, 227–229; 707/1–5, 10, 707/100, 101, 104.1; 715/513–514
See application file for complete search history.

(56) References Cited

U.S. PATENT DOCUMENTS

| | | | | |
|---|---|---|---|---|
| 5,909,570 | A * | 6/1999 | Webber | 703/13 |
| 6,219,673 | B1 * | 4/2001 | Blackman et al. | 707/103 R |
| 6,377,957 | B1 * | 4/2002 | Jeyaraman | 707/200 |
| 6,601,071 | B1 * | 7/2003 | Bowker et al. | 707/102 |
| 6,681,370 | B1 * | 1/2004 | Gounares et al. | 715/513 |
| 6,778,983 | B1 * | 8/2004 | Bates et al. | 707/4 |

FOREIGN PATENT DOCUMENTS

| | | |
|---|---|---|
| JP | 10-105514 | 4/1998 |
| JP | 2000-47966 | 2/2000 |
| JP | 2000-67075 | 3/2000 |
| WO | WO 00/45304 | 8/2000 |

OTHER PUBLICATIONS

Extensible Markup Language (XML) 1.0 (Second Edition), W3C Recommendation Oct. 6, 2000.*
Andreas Laux and one other: XUpdate Working Draft, (online), Sep. 14, 2000, XML:DB Project, (retrieved Sep. 5, 2005), Internet <URL: http://xmldb-org.sourceforge.net/xupdate/xupdate-wd.html>.
Media Fusion Co., Ltd. XML Lab and 8 others: Development of web applications using XML databases. Softbank Publishing Co., Ltd., Mar. 16, 2001, Fist edition, p. 124 and 125 (explanation of XUpdate of Cited Literature 1).

* cited by examiner

*Primary Examiner*—Ario Etienne
*Assistant Examiner*—Yasin Barqadle
(74) *Attorney, Agent, or Firm*—Foley & Lardner LLP

(57) ABSTRACT

When XML data stored in a server are to be updated, a client displays an update form by using update form display means. The update form includes paths, methods and values (after addition or change) of elements of XML data. Then, the paths, methods and values are inputted into input boxes in the update form. Then, an update instruction is generated on the basis of the information inputted into the input boxes, and is transferred to data update mean in the server. Thus, the client need not to convert the XML data into the DOM object, and a memory capacity of the client is reduced, because the update instruction includes only the paths, methods and values.

10 Claims, 21 Drawing Sheets

FIG.2

```
<ORGANIZATION>
  <DEPARTMENT>
    <NAME> DEVELOPMENT DEPARTMENT</NAME>
    <MEMBER>YAMAMOTO Taroh</MEMBER>              ~201
  </DEPARTMENT>
  <DEPARTMENT>
    <NAME>SALES DEPARTMENT</NAME>
    <MEMBER>SATOH Ichiroh</MEMBER>
    <MEMBER>TANAKA Makoto</MEMBER>               ~202
  </DEPARTMENT>
</ORGANIZATION>
```

FIG.3

UPDATE FORM

INPUT PARAMETERS  /301
XML STRUCTURE IS
"ORGANIZATION/DEPARTMENT/MEMBER"

path: [           ] 302 method: [         ] 303 value: [          ] 304

[TRANSMISSION] 305

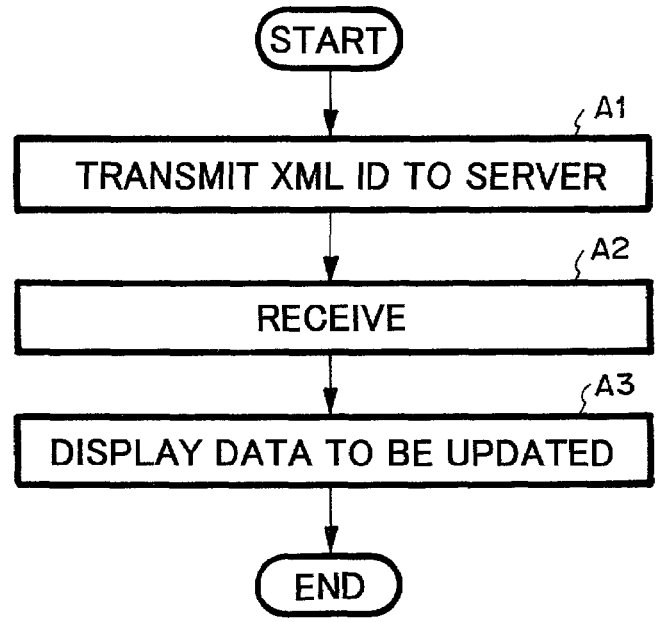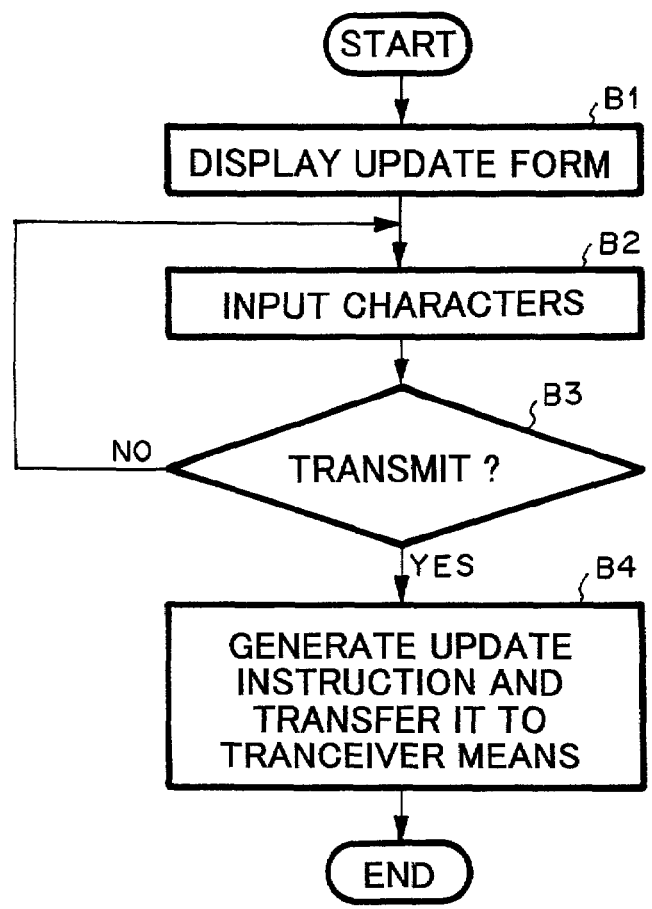

FIG.7

```
<ORGANIZATION>
   <DEPARTMENT>
      <NAME> DEVELOPMENT DEPARTMENT</NAME>
      <MEMBER>YAMAMOTO Taroh</MEMBER>
   </DEPARTMENT>
   <DEPARTMENT>
      <NAME>SALES DEPARTMENT</NAME>
      <MEMBER>SATOH Ichiroh</MEMBER>
      <MEMBER>TANAKA Makoto</MEMBER>
      <MEMBER>SUZUKI Hanako</MEMBER>
   </DEPARTMENT>
</ORGANIZATION>
```

FIG.8

```
<ORGANIZATION>
   <DEPARTMENT>
      <NAME> DEVELOPMENT DEPARTMENT</NAME>
      <MEMBER>YAMAMOTO Taroh</MEMBER>
   </DEPARTMENT>
   <DEPARTMENT>
      <NAME>SALES DEPARTMENT</NAME>
      <MEMBER>SATOH Ichiroh</MEMBER>
      <MEMBER>TANAKA Makoto</MEMBER>
      <MEMBER></MEMBER>
      <MEMBER>INOUE Naoya</MEMBER>
   </DEPARTMENT>
</ORGANIZATION>
```

FIG.9

```
<ORGANIZATION>
    <DEPARTMENT>
        <NAME> DEVELOPMENT DEPARTMENT</NAME>
        <MEMBER>YAMAMOTO Taroh</MEMBER>
    </DEPARTMENT>
    <DEPARTMENT>
        <NAME>SALES DEPARTMENT</NAME>
        <MEMBER>SATOH Ichiroh</MEMBER>
        <MEMBER>NAKADA Makoto</MEMBER>
    </DEPARTMENT>
</ORGANIZATION>
```

FIG.10

```
<ORGANIZATION>
    <DEPARTMENT>
        <NAME> DEVELOPMENT DEPARTMENT</NAME>
        <MEMBER>YAMAMOTO Taroh</MEMBER>
    </DEPARTMENT>
    <DEPARTMENT>
        <NAME>SALES DEPARTMENT</NAME>
        <MEMBER>SATOH Ichiroh</MEMBER>
    </DEPARTMENT>
</ORGANIZATION>
```

FIG.12

```
<!DOCTYPF HTML PUBLIC"-//W3C//DTD HTML 4.01 Transitional//EN">
<html xsl:version=1.0"
      xmlns:xsl="http://www.w3.org/1999/XSL/Transform">
<head>
    <title>ORGANIZATION INFORMATION UPDATE FORM</title>
</head>
<body>ORGANIZATION
    <form method="POST"
          action="http://www.hoge.com/update.cgi ">
                                                   ・
                                                   ・
                                                   ・
NAME<input type="text" name="data1value"
           value="{/ORGANIZATION/DEPARTMENT[1]/MEMBER[1]}">   ~1201
                                                   ・
                                                   ・
                                                   ・
NAME<input type="text" name="data2value"
           value="{/ORGANIZATION/DEPARTMENT[1]/MEMBER[2]}">   ~1202
                                                   ・
                                                   ・
                                                   ・
NAME<input type="text" name="data8value"
           value="{/ORGANIZATION/DEPARTMENT[2]/MEMBER[4]}">   ~1203
    </form>
</body>
</html>
```

FIG.13

```
<!DOCTYPE HTML PUBLIC"-//W3C//DTD HTML 4.01 Transitional//EN">
<html>
    <head>
        <title>ORGANIZATION INFORMATION UPDATE FORM</title>
    </head>
    <body>ORGANIZATION
        <form method="POST"
            action="http://www.hoge.com/update.cgi">
                                    . . .
NAME<input type="text" name="data1value" value="YAMAMOTO Taroh">  ~1301
    <input type="hidden" name="data1method" value="set">           ~1302
    <input type="hidden" name="data1path"
            value="/ORGANIZATION/DEPARTMENT[1]/MEMBER[1]">          ~1303
NAME<input type="text" name="data2value" value=" ">                ~1304
    <input type="hidden" name="data2method" value="set">           ~1305
    <input type="hidden" name="data2path"
            value="/ORGANIZATION/DEPARTMENT[1]/MEMBER[2]">          ~1306
                                    . . .
        </form>
    </body>
</html>
```

FIG. 14

| ORGANIZATION INFORMATION UPDATE FORM |

ORGANIZATION
    DEVELOPMENT DEPARTMENT

- NAME [ YAMAMOTO Taroh ] ~1401
- NAME [ ] ~1402
- NAME [ ] ~1403
- NAME [ ] ~1404

SALES DEPARTMENT

- NAME [ SATOH Ichiroh ] ~1405
- NAME [ TANAKA Makoto ] ~1406
- NAME [ ] ~1407
- NAME [ ] ~1408

[ TRANSMISSION ] ~1409

FIG.18

UPDATE FORM

INPUT PARAMETERS  /―301
XML STRUCTURE IS
"ORGANIZATION/DEPARTMENT/MEMBER"

path: [              ]
              ⌇302 method: [              ]
              ⌇303 value: [              ]
              ⌇304

[ TRANMSISSION ]    [ STORAGE ]
   ⌇305               ⌇306

FIG.22

ORGANIZATION INFORMATION UPDATE FORM

ORGANIZATION

DEVELOPMENT DEPARTMENT

| | | |
|---|---|---|
| NAME | YAMAMOTO Taroh | ~1401 |
| NAME | | ~1402 |
| NAME | | ~1403 |
| NAME | | ~1404 |

SALES DEPARTMENT

| | | |
|---|---|---|
| NAME | SATOH Ichiroh | ~1405 |
| NAME | TANAKA Makoto | ~1406 |
| NAME | | ~1407 |
| NAME | | ~1408 |

TRANSMISSION　1409　　　STORAGE　1410

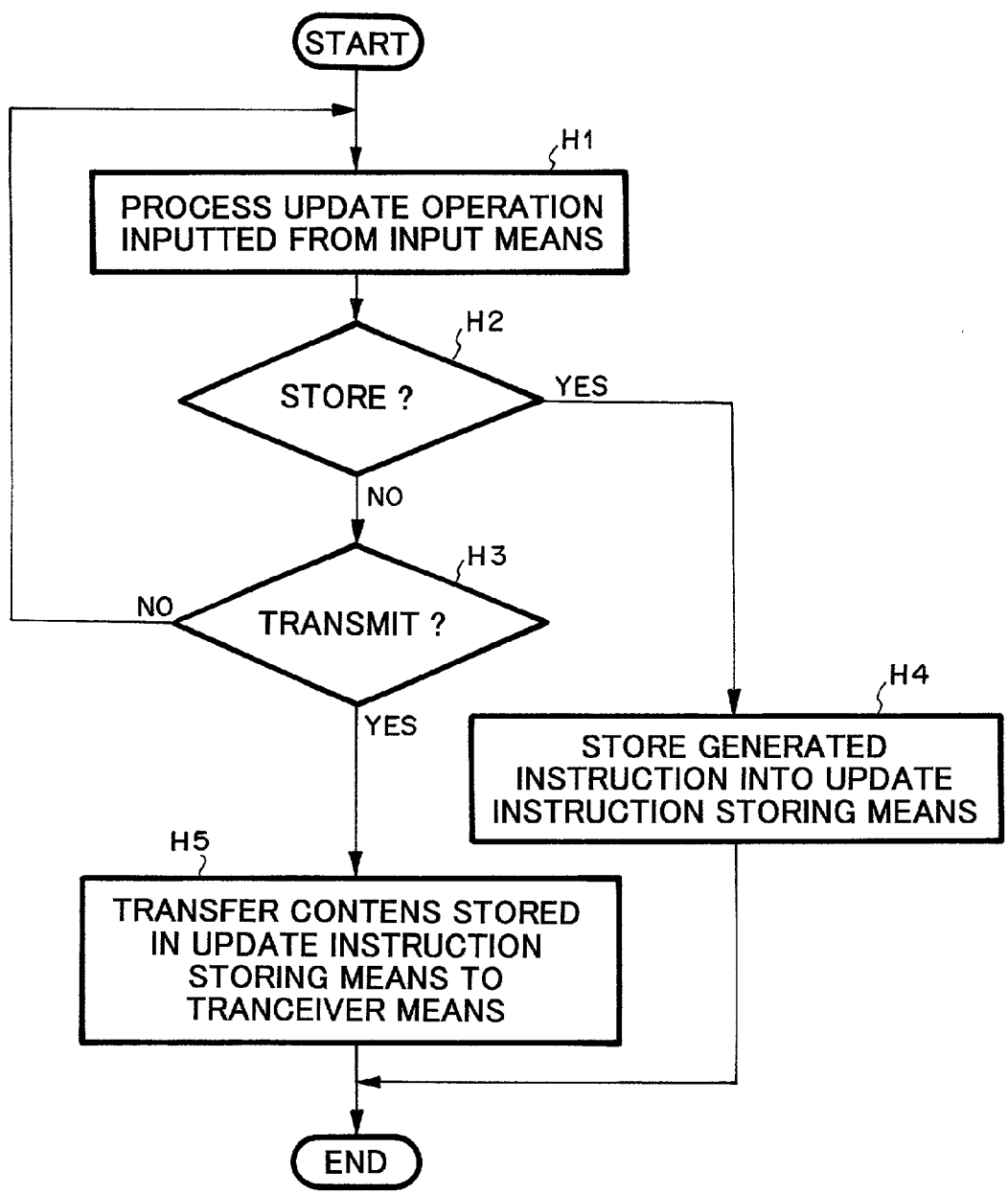

METHOD AND APPARATUS FOR UPDATING XML DATA

BACKGROUND OF THE INVENTION

1. Technical Field of the Invention

The present invention relates to a method and system for updating data described in the extensible markup language (XML) and stored in a server such as a world wide web server (WWW server).

2. Description of the Prior Art

The XML data are updated conventionally as follows in network systems including the WWW server and the clients.

First, the client requests an XML data, and the server transfers the XML data to be updated through a network. Then, the client updates the XML data and transmits the updated XML data. Here, the client updates the XML data, by using such programs as a XML Perser for transforming the XML data into document object model (DOM) object, an application program for updating the DOM object and a program for transforming the updated DOM object into the XML data. Finally, the server replaces the original XML data by the updated XML data.

However, the above-mentioned prior art has the following disadvantages.

First, transmitted data quantity becomes large, because all the original XML data are transferred to the client and all the updated XML data are transferred to the server. Further, it takes much time for the client to update the original XML data, because the client must transform the original XML data into the DOM object, by using hardware poor than that of the server.

Further, the client should be equipped with additional memory capacity for the program for transforming the XML data into the DOM object.

SUMMARY OF THE INVENTION

An object of the present invention is to update the XML data rapidly by using smaller memory capacity.

In the present invention, a server stores XML data, and a client updates the XML data. Here, the server is connected with the client. The client transmits an update instruction including paths, methods and values of elements in the XML data to be updated, and the server updates the element in accordance with the update instruction.

Therefore, according to the present invention, the client does not need to convert the XML data into the DOM object. Further, data transfer quantity is reduced, because only the update instruction including the paths, methods and values is transmitted to the server. As a result, it takes less time to update the XML data, and a memory capacity in the client is reduced.

Further, in the present invention, the client stores a plurality of update instructions each of which includes a path, a method and a value, whenever the client updates the XML data by designating the path, method and value, stores stored order of each of the update instructions, and transmits to the server collectively the plurality of update instructions together with the stored order. The server updates the element in accordance with the update instruction.

Therefore, according to the present invention, the XML data are updated collectively.

BRIEF EXPLANATION OF THE DRAWINGS

FIG. 2 is an example of XML data to be updated;

FIG. 3 is an example of an update form;

FIG. 4 is a flow chart for update data acquiring means 111;

FIG. 5 is a flow chart fro update form display means 112 and update instruction generating means 113;

FIG. 7 is an example of adding an element to the XML data as shown in FIG. 2;

FIG. 8 is an example of adding an element to the XML data as shown in FIG. 2;

FIG. 9 is an example of changing a value of one of the XML data as shown in FIG. 2;

FIG. 10 is an example of deleting one of the XML data as shown in FIG. 2;

FIG. 12 is an exemplary template for generating an update form;

FIG. 13 is an exemplary update form data generated by form generating means 25;

FIG. 14 is an exemplary update form;

FIG. 18 is an exemplary update form;

FIG. 22 is an exemplary update form; and

FIG. 23 is a flow chart for update instruction generating means 115c.

PREFERRED EMBODIMENT OF THE INVENTION

Embodiment 1

Figure 1:
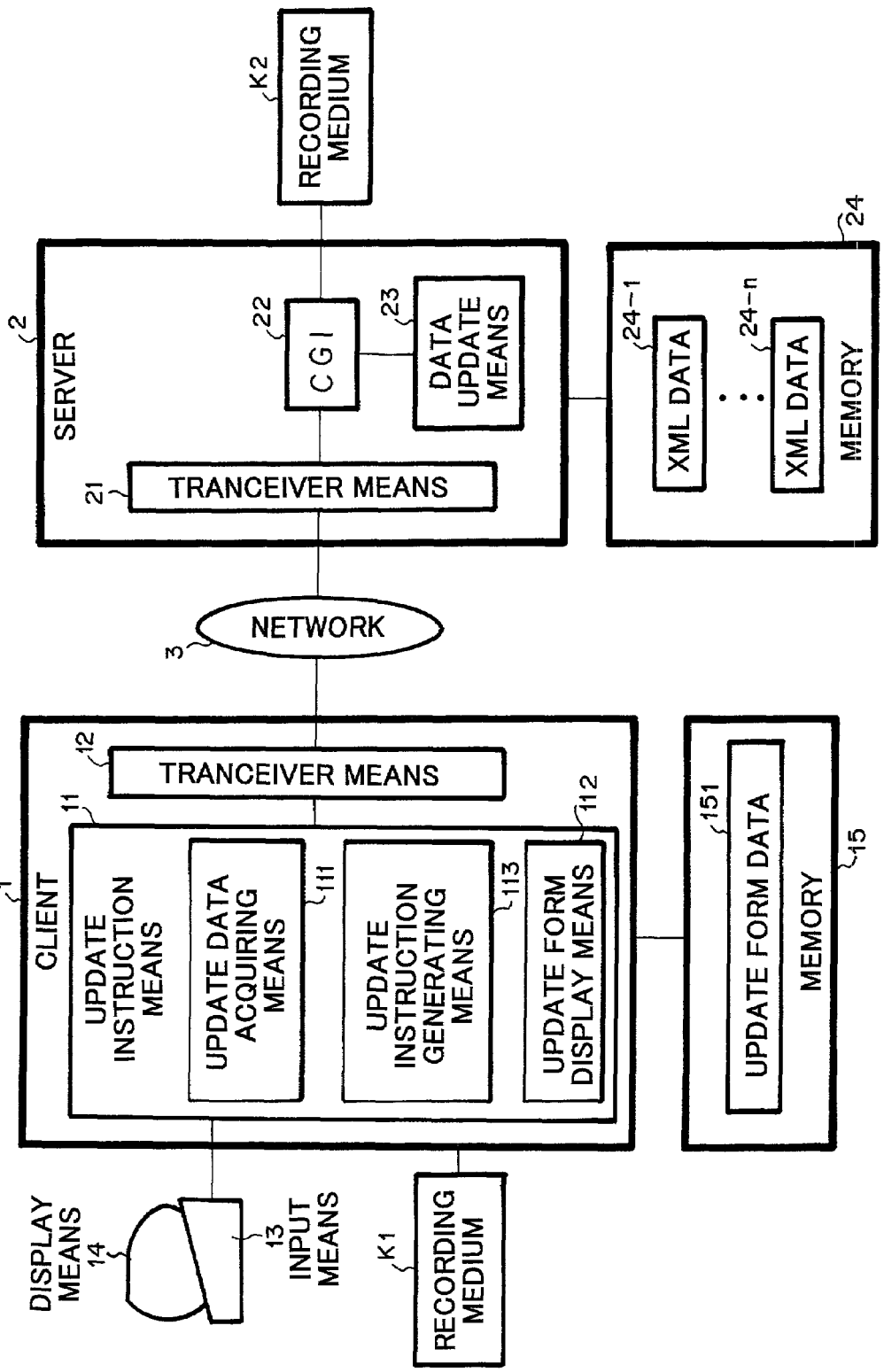
FIG. 1 is a block diagram of an exemplary embodiment of the present invention.

FIG. 1 is a block diagram of an exemplary system of the present invention, which comprises client 1 such as a personal computer, server 2 such as a host computer and network 3 such as the Internet.

Client 1 comprises update instruction means 11 and transceiver means 12. Further, client 1 is connected with input means 13 such as a keyboard, display 14 such as a CRT, memory means 15 for storing update form data 151.

Transceiver means 12 transmits and receives data by using the hypertext transfer protocol (HTTP) to and from server 2 through network 3.

Update instruction means 11 obtains the XML data from server 2, displays the XML data on display 14, displays the update form on display 14, transmits update instructions which are executed on the update form. Here, update instruction means 11 comprises updated data acquiring means 111, update form displaying means 112 and update instruction generating means 113.

Update data acquiring means 111 transmits to server 2 an XML data identifier inputted from input means 13 and displays on display 14 the XML data transmitted by server 2.

FIG. 2 is an example of XML data from server 2. The root element in this example is <organization>. There are two <department> elements in a rank lower than the toot element. The first <department> has a <name> development department and a <member> YAMAMOTO Taroh, while the second <department> has a <name> sales department, <member> SATOH Ichiroh and<member> TANAKA Makoto.

Update form display means 112 display the update form on display 14, on the basis of update form data 151 in memory 15.

FIG. 3 is an example of the update form which includes structure 301 of data to be updated, input box 302 for path data, input box 303 for method data, input box 304 for value data and transmission button 305.

The path data inputted into input box 302 describes an element to be updated in XML data. The element to be updated is specified by arranging descendant element added by "/" in a hierarchical order starting from the root element. Further, when there are a plurality of elements with an identical name on a rank, [N] is added after the element name to indicate that the element is the Nth element counted from the first element on that rank. For example, element 201 as shown in FIG. 2 is inputted into input box 302 by specifying /organization/department [1]/member [1], while element 202 as shown in FIG. 2 is inputted into input box 302 by specifying /organization/department [2]/member [2]. When [N] is omitted, all the elements with an identical name are deemed to be specified.

The method data inputted into input box 303 specifies a method to be updated. For example, "set" or "remove" is inputted for the method. The "set" command adds an element when there is no element at a location of XML data specified by "path", while the "set" updates a content of already defined element. The "remove" command deletes an element at a location specified by "path". Further, "remove" deletes all the elements dominated by an element which is specified by "path".

The value data inputted into input box 304 specifies a value of an element to be added or changed. Therefore, when "remove" is inputted into input box 303, there is no need to input "value".

Update instruction generating means 113 generate an update instruction including the path, method and value which are inputted in boxes 302, 303 and 304, respectively, and then transfers the update instruction to transceiver means 12.

Recording medium K1 such as a magnetic disk, optical disk, semiconductor memory stores a computer readable program which implements update data acquiring means 111, update form display means 112, update instruction generating means 113 and transceiver means 12 on client 1.

Server 2 comprises transceiver means 21, common gateway interface (CGI) 22, and data update means 23. Further, server 2 is connected with recording medium K2 and memory 24 for storing XML data 24-1 to 24-n.

Transceiver means 21 transmits and receives XML data to and from client 1 through network 3, in accordance with the hypertext transfer protocol (HTTP).

Data update means 23 updates XML data, in accordance with the update instruction given by CGI 22.

Recording medium K2 such as a magnetic disk, optical disk, semiconductor memory stores a computer readable program which transceiver means 21, CGI 22 and data update means on server 2.

Next, the operation of the above-mentioned embodiment is explained.

The user of client 1 inputs into input means 13 XML identifiers of XML data 24-1 to 24-n to be updated, when the user want to know what those XML data are like.

Then, updated data acquiring means 111 transmits the XML identifiers through transceiver means 12 to server 2, and waits for the XML data from server 2 (FIG. 4, A1, A2). Server 2 reads out from memory 24, and transmits them to client 1. Updated data acquiring means 111 in client 1 displays on display 14 the XML data transmitted by server 2.

The user of client 1 recognizes paths or locations and other information of the elements to be updated, on the basis of the XML data displayed on display 14. However, steps A1 to A3 are not necessary, when the user can recognize locations and other information of the elements to be updated, without acquiring the XML data from server 2, for example when a copy of the XML data to be updated is stored.

Then, the user starts update form display means 112 which reads out update form data 151 from memory 15, and displays on display 14 an update form as shown in FIG. 3 (FIG. 5, B1).

Then, the user inputs characters by using input means 13. Update form display means 112 inputs the characters into input boxes 302 to 304 (B2). When the character input is finished, the user clicks transmission button 305. Then, update instruction generating means 113 generates an update instruction on the basis of the characters in input boxes 302 to 304, and transfers the update instruction together with the XML identifiers to transceiver means 12 which transmits to server 2 the update instruction added with the XML identifiers (B3, B4).

The update instruction with the XML identifiers is received by transceiver means 21 in server 2, and transferred through CGI 22 to data update means 23 which updates the XML data identified by the XML identifiers in accordance with the update instruction.

Next, the update operation is explained on the basis of a concrete example.

First, an addition of element is explained. It is assumed that a new <member>SUZUKI Hanako is added after two <member> elements in the second <department>. In this case, "/organization/department[2]/member[3]" is inputted into input box 302 of the update form as shown in FIG. 3, "set" is inputted into input box 303, and "SUZUKI Hanako" is inputted into input box 304 (FIG. 5, B1, B2).

When these are inputted, the user clicks transmission button 305. Then, update instruction generating means 113 generates the following update instruction wherein the parameters, "path", "method" and "value" are equal to the characters inputted into input boxes 302, 303 and 304, respectively.

path=/organization/department[2]/member[3]
method=set
value=SUZUKI Hanako

Transceiver means 12 transfers the update instruction added with the XML identifiers from update instruction generating means 113 to server 2, in accordance with the HTTP. The update instruction with the XML identifiers is received by transceiver means 21 in server 2 and transferred through CGI 22 to data update means 23.

Figure 6:
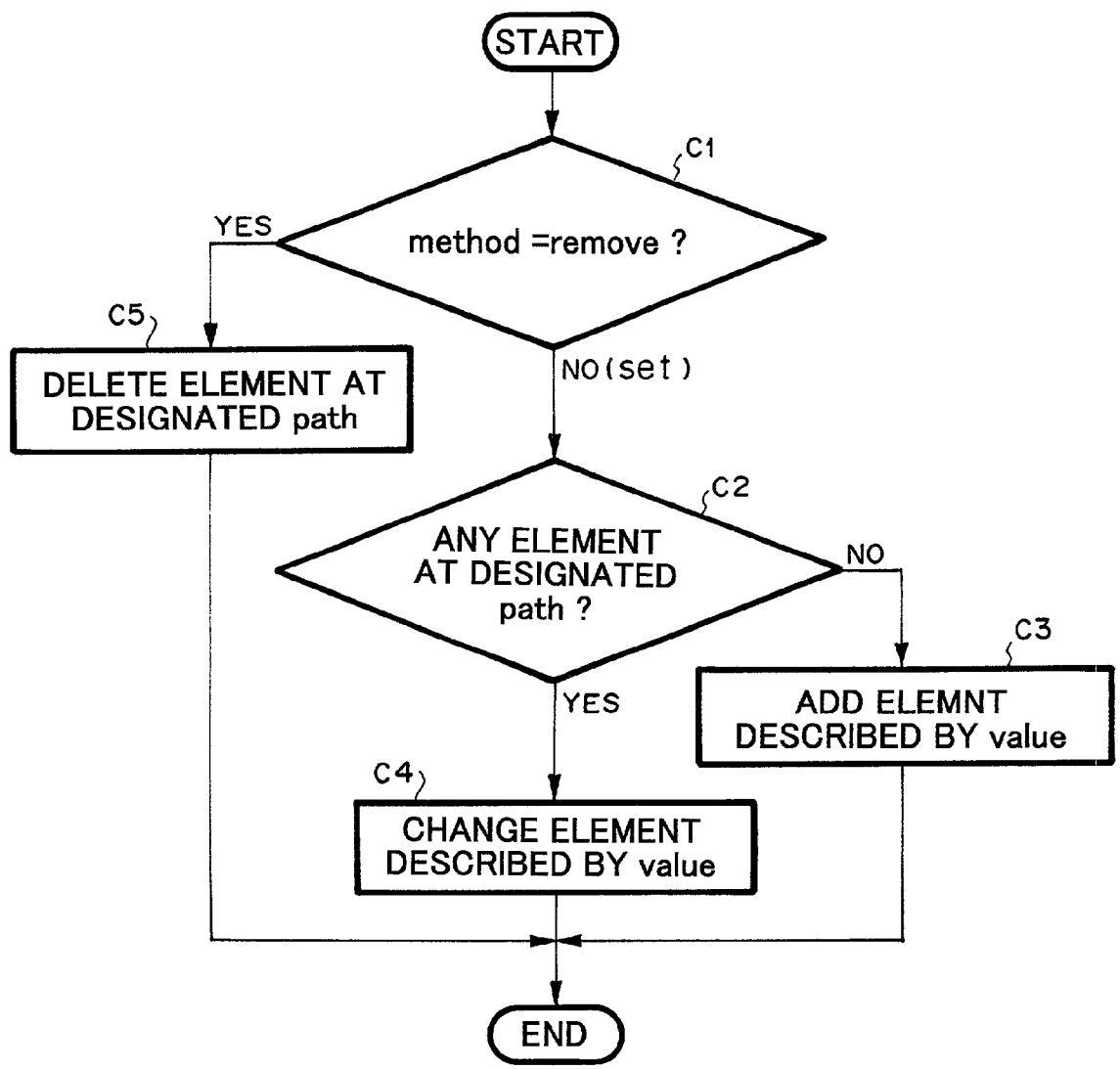
FIG. 6 is a flow chart for data update means 23.

Then, data update means 23 updates the XML data identified by the XML identifiers in memory 24, in accordance with the flow chart as shown in FIG. 6. In this example, decision C1 is branched to "NO", because method=set. Further, decision C2 is branched to "NO", because there is not a third <Member> element in the second <department> element. Therefore, data update means 23 adds an element, in accordance with the "value" "SUZUKI Hanako" in step C3, thereby updating the XML data, as shown in FIG. 7.

Further, it is assumed that a forth <member> INOUE Naoya is added. In this case, "/organization/department[2]/member[4]" is inputted into input box 302 of the update form as shown in FIG. 3, "set" is inputted into input box 303, and "INOUE Naoya" is inputted into input box 304 (FIG. 5, B1, B2). When these are inputted, the user clicks transmission button 305. Then, update instruction generating means 113 generates the following update instruction wherein the parameters, "path", "method" and "value" are equal to the characters inputted into iput boxes 302,303 and 304, respectively.

path=/organization/department[2]/member[4]
method=set
value=INOUE Naoya

Transceiver means 12 transfers the update instruction added with the XML identifiers from update instruction generating means 113 to server 2, in accordance with the HTTP. The update instruction with the XML identifiers is received by transceiver means 21 in server 2 and transferred through CGI 22 to data update means 23.

Then, data update means 23 updates the XML data identified by the XML identifiers in memory 24, in accordance with the flow chart as shown in FIG. 6. In this example, both decisions C1 and C2 are branched to "NO". Therefore, data update means 23 adds an element, in accordance with the "value" "INOUE Naoya" in step C3, thereby updating the XML data, as shown in FIG. 8.

Further, it is assumed that a second <member> TANAKA Makoto is changed to NAKADA Makoto. In this case, "/organization/department[2]/member[2]" is inputted into input box 302 of the update form as shown in FIG. 3, "set" is inputted into input box 303, and "NAKADA Makoto" is inputted into input box 304 (FIG. 5, B1, B2). When these are inputted, the user clicks transmission button 305. Then, update instruction generating means 113 generates the following update instruction.

path=/organization/department[2]/member[2]
method=set
value=NAKADA Makoto

Transceiver means 12 transfers the update instruction added with the XML identifiers from update instruction generating means 113 to server 2, in accordance with the HTTP. The update instruction with the XML identifiers is received by transceiver means 21 in server 2 and transferred through CGI 22 to data update means 23.

Then, data update means 23 updates the XML data identified by the XML identifiers in memory 24, in accordance with the flow chart as shown in FIG. 6. In this example, decision C1 is branched to "NO", and decision C2 is branched to "YES". Therefore, data update means 23 changes a value of element, in accordance with the value "NAKADA Makoto" in step C4, thereby changing the XML data, as shown in FIG. 9.

Further, it is assumed that a second <member> element is deleted. In this case, "/organization/department[2]/member[2]" is inputted into input box 302 of the update form as shown in FIG. 3, "remove" is inputted into input box 303 (FIG. 5, B1, B2). When these are inputted, the user clicks transmission button 305. Then, update instruction generating means 113 generates the following update instruction.
path=/organization/department[2]/member[2]
method=remove Transceiver means 12 transfers the update instruction added with the XML identifiers from update instruction generating means 113 to server 2, in accordance with the HTTP. The update instruction with the XML identifiers is received by transceiver means 21 in server 2 and transferred through CGI 22 to data update means 23.

Then, data update means 23 updates the XML data identified by the XML identifiers in memory 24, in accordance with the flow chart as shown in FIG. 6. In this example, decision C1 is branched to "YES". Therefore, data update means 23 deletes an element designated by the parameter "path" in step C5, thereby changing the XML data, as shown in FIG. 10.

Embodiment 2

Figure 11:
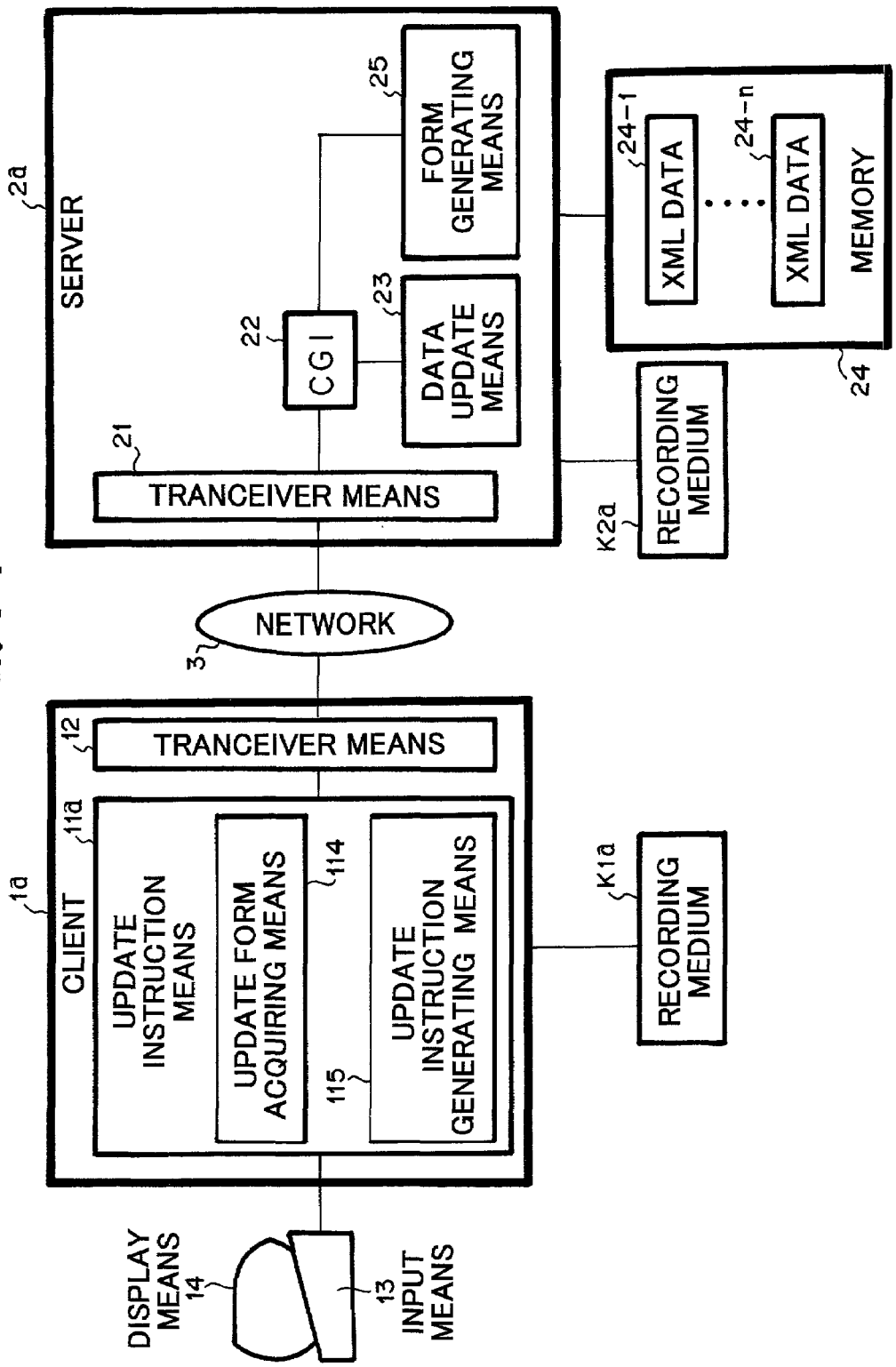
FIG. 11 is a block diagram of another embodiment of the present invention.

FIG. 11 is a block diagram of another embodiment of the present invention, which comprises client 1a, server 2a and network 3 connecting them.

Client 1a comprises update instruction means 11a and transceiver means 12. Further, client 1a is connected with input means 13, display 14 and recording medium K1a.

Update instruction means 11a acquires update form data from server 2a, displays the XML data on display 14, transfers to transceiver means 12 update instructions which are executed on the update form. Here, update instruction means 11a comprises update form acquiring means 114 and update instruction generating means 115.

Update form acquiring means 114 transmits to server 2 the XML identifiers to be updated and displays on display 14 the update form transmitted by server 2a.

Update instruction generating means 115 generate an update instruction, on the basis of the update operation by the user and the update form data from server 2a and then transfers the update instruction to transceiver means 12.

Recording medium K1a such as a magnetic disk, optical disk, semiconductor memory stores a computer readable program which implements update form acquiring means 114, update instruction generating means 115 and transceiver means 12 on client 1a.

Server 2a is different from server 2 in that form generating means 25 and recording medium K2a are added.

Form generating means 25 generates an update form data, on the basis of the XML data in memory 24 and a template for the update form.

FIG. 12 is an exemplary template for the update form which is described by HTML. The update form data by HTML as shown in FIG. 13 is generated on this template for the data as shown in FIG. 2. In accordance with this update form data, an update form as shown in FIG. 14 is displayed.

Element 1201 in the template as shown in FIG. 12 instructs to display the input box into which the value of "/organization/department[1]/member [1]" has been already inputted. Element 1202 instructs to display the input box into which the value of "/organization/department[1]/member [2]" has been already inputted. Element 1203 instructs to display the input box into which the value of "/organization/department[1]/member [4]" has been already inputted.

Element 1301 in the update form data as shown in FIG. 13 instructs to display the input box into which "YAMAMOTO Taroh" has been already inputted. Input box 1401 as shown in FIG. 14 is displayed on the basis of element 1301. Here, "YAMAMOTO Taroh" is the value of element 201 as shown in FIG. 2 which is designated by "/organization/department[1]/member [1]" in element 1201 as shown in FIG. 12. Element 1302 instructs to let the parameter "method" in the update instruction be "set". Element 1303 instructs to let the parameter "path" be "/organization/ department[1]/member [1]". Elements 1302 and 1303, which are not displayed on the update form, are utilized for update operation by input box 1401. The description "/organization/department[1]/member [1]" in element 1303 is the same information in element 1201 as shown in FIG. 12.

Element 1304 in the update from data as shown in FIG. 13 instructs to display vacant input box 1402 as shown in FIG. 14, because there is not any element in XML data as shown in FIG. 2 designated by element 1202 as shown in FIG. 12. Element 1305 instructs to let the parameter "method" in the update instruction be "set". Element 1306 instructs to let the parameter "path" be "/organization/department[1]/member [2]". Elements 1305 and 1306, which are not displayed on the update form, are utilized for update operation by input box 1402. The description "/organization/department[1]/member [2]" in element 1306 is the same information in element 1201 as shown in FIG. 12.

Recording medium K2a such as a magnetic disk, optical disk, semiconductor memory stores a computer readable program which implements transceiver means 21, CGI 22, data update means 23 and form generating means 25 on server 2a.

Next, the operation of the Embodiment 2 is explained.

When the XML data stored in memory 24 are updated, the user of client 1a starts update form acquiring means 114 and inputs by using input means 13 the XML identifiers of the XML data to be updated.

Figure 15:
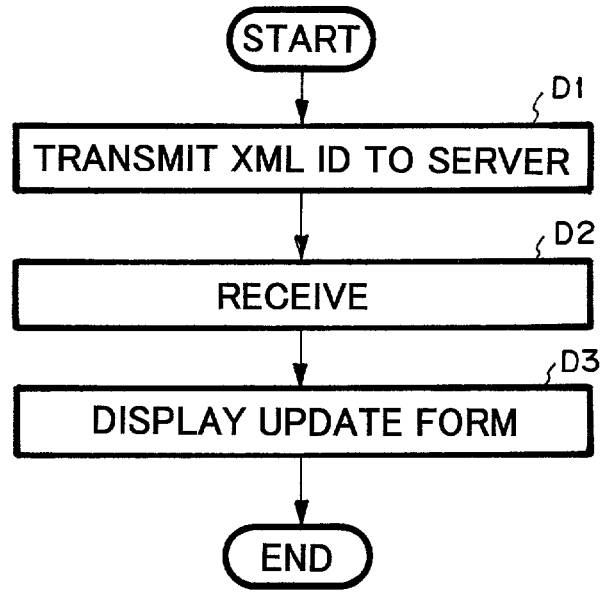
FIG. 15 is a flow chart for update form acquiring means 114.

Then, update form acquiring means 114 transmits the XML identifiers inputted into input means 13 through transceiver means 12 to server 2a, and waits for the update form data transmitted by server 2a (FIG. 15, D1, D2).

Transceiver means 21 in server 2a receives the XML identifiers transmitted by client 1a, and transfers them to form generating means 25 which generates the update form data by HTML as shown in FIG. 13, on the basis of the XML data stored in memory 24 and the template as shown in FIG. 12. The update form data is transmitted to client 1a through CGI 22, transceiver means 21 and network 3.

When the update form data is received by client 1a, update form acquiring means 114 displays the update form as shown in FIG. 14 on display 14 (D3). The update form includes eight input boxes 1401 to 1408 and transmission button 1409, as shown in FIG. 14.

Figure 16:
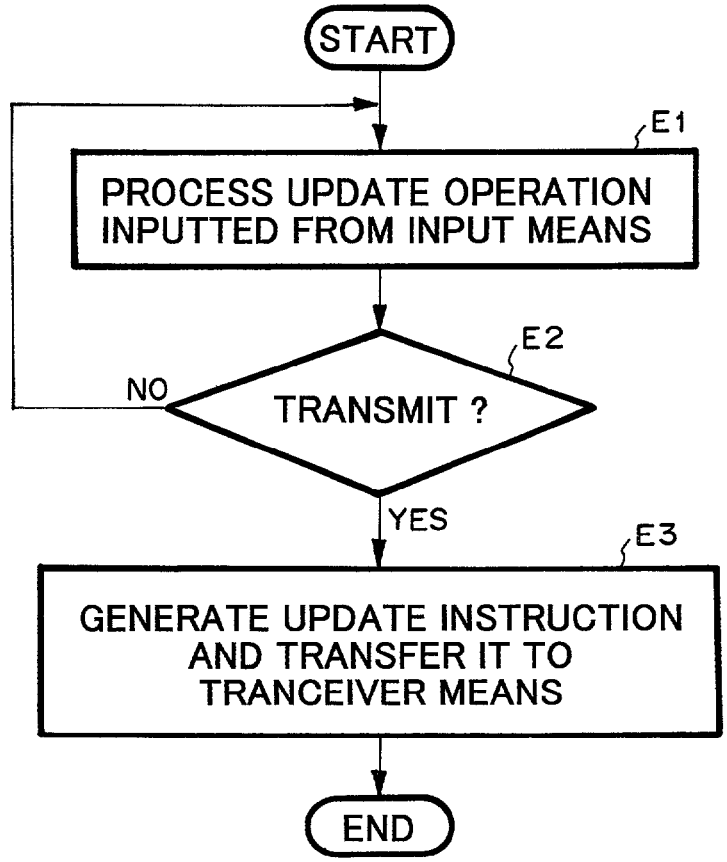
FIG. 16 is a flow chart for update instruction generating means 115.

When the update form is displayed, the user of client 1a executes by using input means 13 the update operation such as inputs and deletions of characters. Update instruction generating means 115 processes the user's operation (FIG. 16, E1). Then, when the user clicks transmission button 1409 (E2), the update instruction is generated and transferred together with the XML identifiers of the XML data to be updated to transceiver means 12 (E3) which transmits to server 2a the update instruction added with the XML identifiers in accordance with HTTP. The update instruction with the XML identifiers is received by transceiver means 21 in server 2a and transferred through CGI 22 to data update means 23 for updating XML data in accordance with the update instruction.

Next, the update operation is explained on the basis of a concrete example.

First, an addition of element is explained. It is assumed that a new <member>SUZUKI Hanako is added in the first <department> in the XML data as shown in FIG. 2. In this case, the user input "SUZUKI Hanako" into input box 1402 as shown in FIG. 14. Then, update instruction generating means 115 displays "SUZUKI Hanako" in input box 1402 (FIG. 16, E1).

When the user clicks transmission button 1409, update instruction generating means 115 generates the following update instruction wherein the parameters, "path", "method" and "value" are described in elements 1306, element 1305, and input box 1402, respectively.

path=/organization/department[1]/member[2]
method=set
value=SUZUKI Hanako

Transceiver means 12 transfers the update instruction added with the XML identifiers to server 2a, in accordance with the HTTP. Then, data update means 23 in server 2a updates the XML data in accordance with the update instruction.

Further, it is assumed that a first <member> YAMAMOTO Taroh in a first <department> as shown in FIG. 2 is changed to YAMADA Taroh. In this case, the user overwrites "YAMADA Taroh" on input box 1401 in the update form as shown in FIG. 14. Then, update instruction generating means 115 displays "YAMADA Taroh" in input box 1401 (FIG. 16, E1).

Then, when the user clicks transmission button 1409, update instruction generating means 115 generates the following update instruction, wherein the parameter "path" is described in element 1303 in input box 1401, the parameter "method" is described in element 1302, and the parameter "value" is described in input box 1401.

path=/organization/department[1]/member[1]
method=set
value=YAMADA Taroh

Transceiver means 12 transfers the update instruction added with the XML identifiers from update instruction generating means 115 to server 2, in accordance with the HTTP. Then, data update means 23 in server 2a updates XML data in accordance with the update instruction.

Further, it is assumed that a first <member> element in a first <department>element as shown in FIG. 2. In this case, the user deletes by using input means 13 the characters "YAMAMOTO Taroh" in input box 1401 in the update form as shown in FIG. 14. Then, update instruction generating means 115 makes input box 1401 vacant and changes "value="set"" in element 1302 corresponding to input box 1401 to "value ="remove"". Then, when the user clicks transmission button 1409, update instruction generating means 115 generates the following update instruction and sends the update instruction together with the XML identifiers to transceiver means 12 (E2, E3). Here, the parameter "path" is described in element 1303 as shown in FIG. 13 corresponding to input box 1401, the parameter "method" is described in element 1302.

path=/organization/department[1]/member[1]
method=remove

Transceiver means 12 transfers the update instruction added with the XML identifiers from update instruction generating means 115 to server 2a, in accordance with the HTTP. Then, data update means 23 in server 2a updates the XML data in accordance with the update instruction.

[Embodiment 3]

Figure 17:
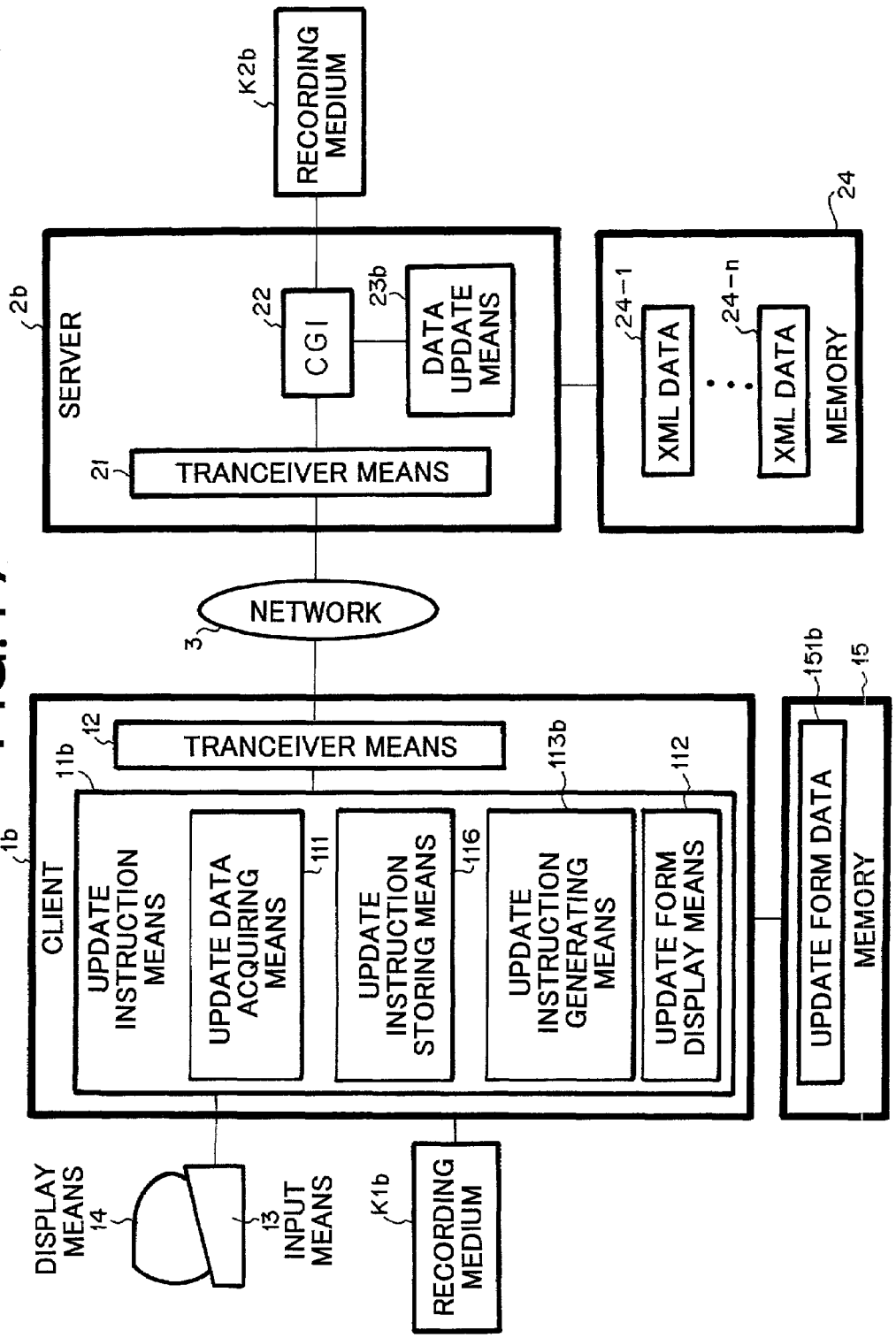
FIG. 17 is other embodiment of the present invention.

FIG. 17 is a block diagram of other embodiment of the present invention, which comprises client 1b, server 2b and network 3 connecting them.

Client 1b is different from client 1 in that client 1b comprises update instruction means 11b in place of update instruction means 11, recording medium K1b in place of recording medium K1, and update form data 151b in place of update form data 151.

Update form data 151b are data for displaying the update form as shown in FIG. 18 which is different from the update form as shown in FIG. 3 in that the update form as shown in FIG. 18 has storage button 306.

Update instruction means 11b is different from update instruction means 11 in that update instruction means 11b comprises update instruction generating means 113b in place of update instruction generating means 113, and update instruction storing means 110.

When the user clicks storage button 306 on the update form, update instruction generating means 113b generates an update instruction, on the basis of the characters in input boxes 302 to 304. Further, update instruction generating means 113b stores the generated update instruction in the stored order into update instruction storing means 116, and transfers the update instruction in update instruction storage means 116 to server 2b in the stored order. Here, the stored order is indicated by the character "N" (N=1, 2, 3, . . . ) in pathN, methodN and valueN.

Recording medium K1b such as a magnetic disk, optical disk, semiconductor memory stores a computer readable program which implements update data acquiring means 111, update form display means 112, update instruction generating means 113b and transceiver means 12 on client 1b.

Server 2b is different from server 2 in that server 2b comprises data update means 23b in place of data update means 23 and recording medium K2b in place of recording medium 2K.

Data update means 23b updates the XML data, in accordance with a plurality of update instructions transmitted from client 1b in the stored order.

Recording medium K2b such as a magnetic disk, optical disk, semiconductor memory stores a computer readable program which implements transceiver means 12, CGI 22 and data update means 23b on server 2b.

Next, the operation of this embodiment is explained. Update data acquiring means 11 is not explained, because it is already explained, referring to FIG. 1.

Figure 19:
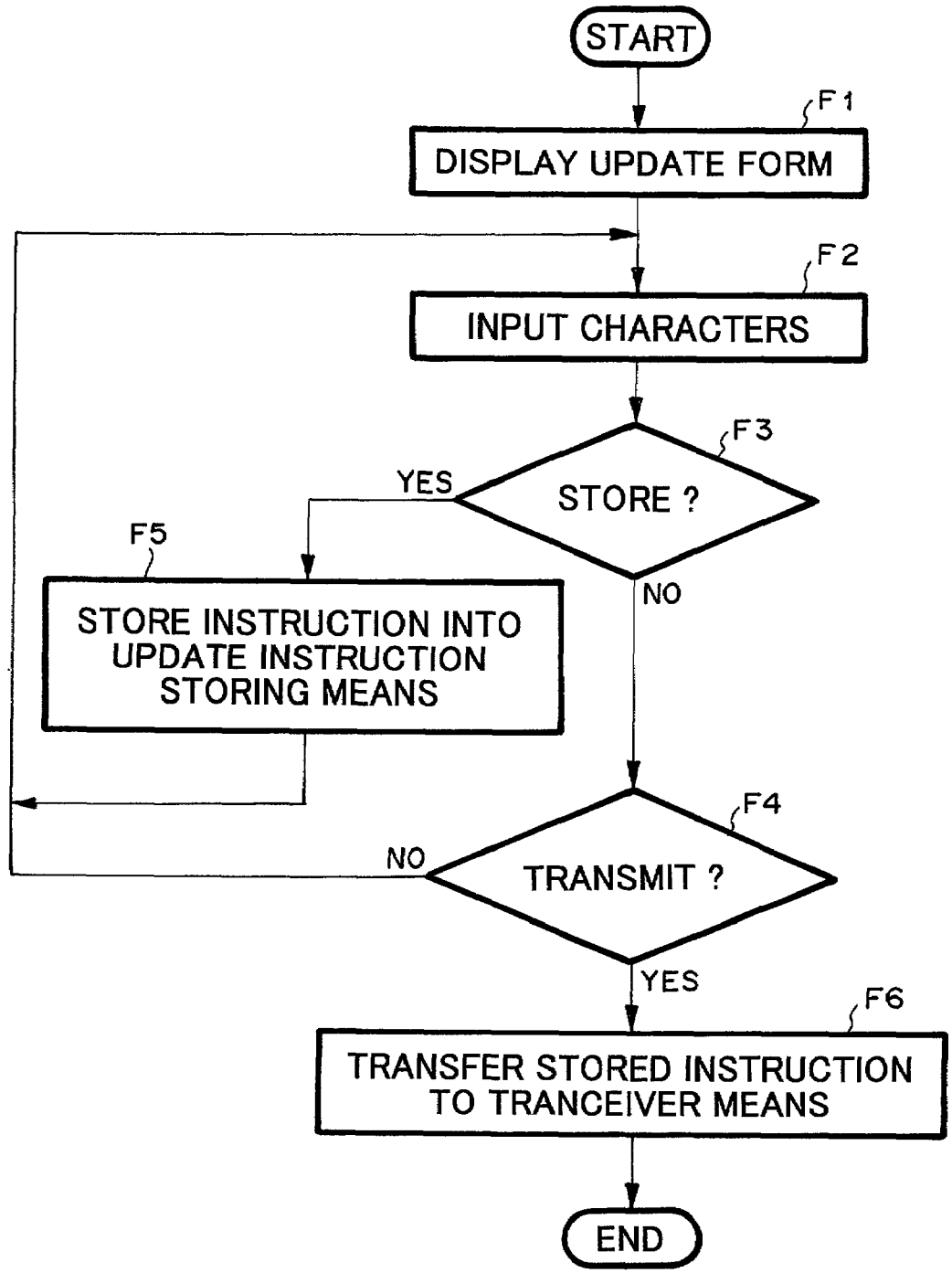
FIG. 19 is a flow chart for update form display means 112 and update instruction generating means 113b.

When the user instructs to display the update form, update form display means 112 displays the update form as shown in FIG. 18 on display 14, on the basis of update form data 151b stored in memory 15 (FIG. 19, F1).

When the update form as shown in FIG. 18 is displayed, the user inputs necessary characters into input boxes 302 to 304. Now, it is assumed that a new <member> SUZUKI Hanako is added in the second <department> in the XML data as shown in FIG. 2. In this case, the user inputs "organization/department [2]/member[3]" into input box 302, inputs "set" into input box 303, and further inputs "SUZUKI Hanako" into input box 304 (FIG. 19, F2).

When the user clicks storage button 306, update instruction generating means 113b generates the following update instruction and stores it into update instruction storing means 116 (F3, F5). Here, update instruction generating means 113b adds "1" after "path", "method" and "value" such as "path1", "method1" and "value1", each of which is described by the characters in input boxes 302 to 304, respectively.

path1=/organization/department[2]/member[3]
method1=set
value1=SUZUKI Hanako

Further, it is assumed that a fourth <member> INOUE Naoya in a second <department> as shown in FIG. 2 is added. In this case, the user inputs "organization/department [2]/member[4]", "set", and "INOUE; Naoya" into input boxes 302, 303 and 304, respectively, and then clicks storage button 306. Then, update instruction generating means 113b generates the following update instruction and stores it into update instruction storing means 116 (F3, F5). Here, update instruction generating means 113b adds "2" after "path", "method" and "value" such as "path2", "method2" and "value2" , each of which is described by the characters in input boxes 302 to 304, respectively.

path2=/organization/department[2]/member[4]
method2=set
value2=INOUE Naoya

Further, it is assumed that a second <member> TANAKA Makoto in a second <department> as shown in FIG. 2 is changed to "NAKADA Makoto. In this case, the user inputs "organization/department[2]/member[2],"set", and "NAKADA Makoto" into input boxes 302, 303 and 304, respectively, and then clicks storage button 306. Then, update instruction generating means 113b generates the following update instruction and stores it into update instruction storing means 116 (F3, F5). Here, update instruction generating means 113b adds "3" after "path", "method" and "value" such as "path3", "method3" and "value3" , each of which is described by the characters in input boxes 302 to 304, respectively.

path3=/organization/department[2]/member[2]
method3=set
value3=NAKADA Makoto

Further, it is assumed that a second <member> TANAKA Makoto in a second <department> as shown in FIG. 2 is deleted. In this case, the user inputs "organization/department[2]/member[2], and "remove" into input boxes 302 and 303, respectively, and then clicks storage button 306. Then, update instruction generating means 113b generates the following update instruction and stores it into update instruction storing means 116 (F3, F5). Here, update instruction generating means 113b adds "4" after "path", "method" and "value" such as "path4", "method4" and "value4", each of which is described by the characters in input boxes 302 and 303, respectively.

path4=/organization/department[2]/member[2]
method4=remove

Then, when the user clicks transmission button 305, update instruction generating means 113b transfers to transceiver means 12 the above-explained four sets of instructions together with the XML identifiers (F4,F6).

Transceiver means 12 transfers, to server 2b in accordance with HTTP, the four sets of instructions together with the XML identifier. The four sets of instructions are received by transceiver 21 in server 2b and transferred through CGI 22 to data update means 23b.

Data update means 23b updates the XML data, in accordance with the first set of instructions including path1, method1 and value1, then in accordance with the second set of instructions including path2, method2 and value2 (FIG. 20, G1, G3), until all the sets of instructions are completed.

Embodiment 4

Figure 21:
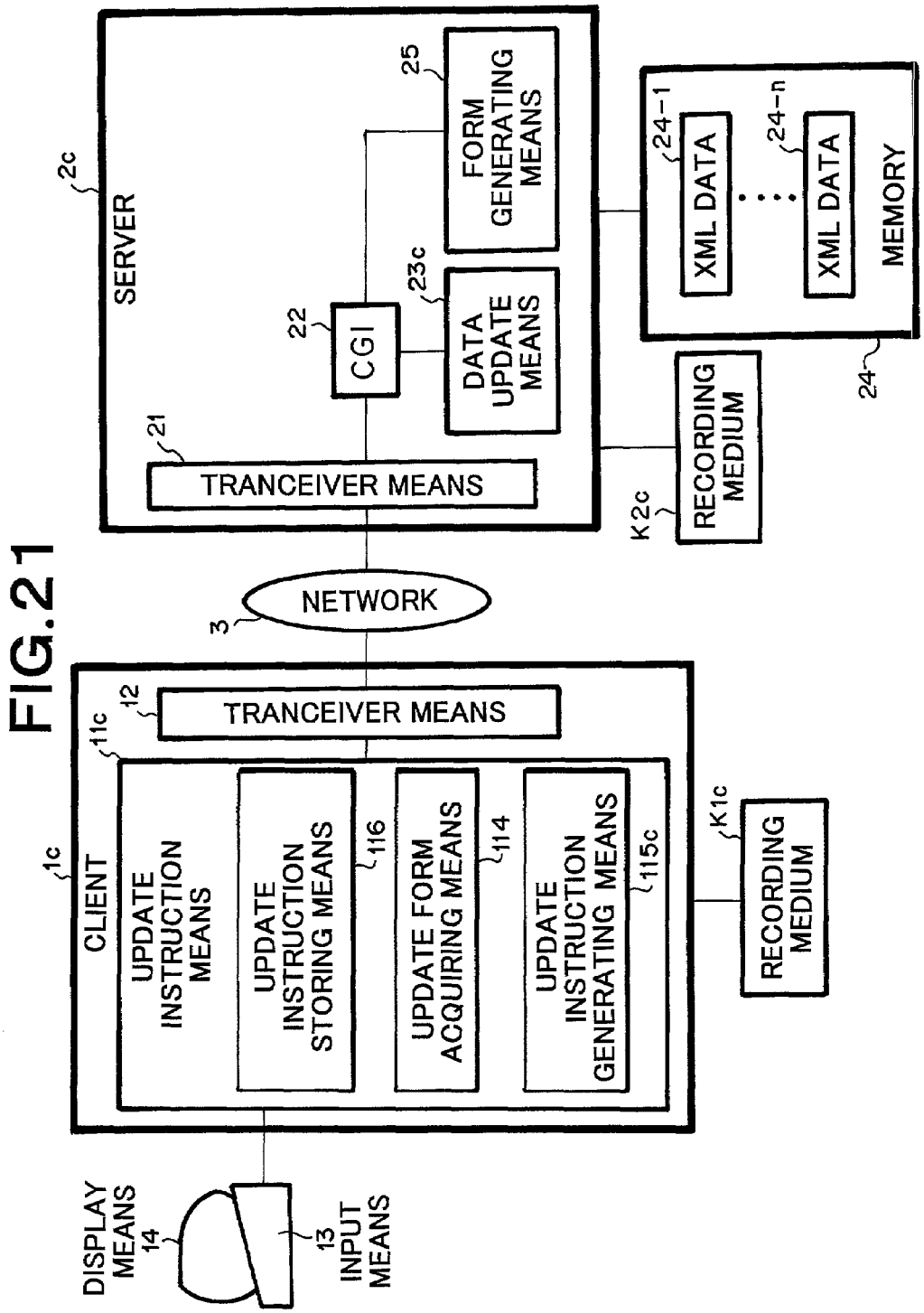
FIG. 21 is a block diagram of still another embodiment of the present invention.

FIG. 21 is a block diagram of still another embodiment of the present invention, which comprises client 1c, server 2c and network 3 connecting them.

Client 1c is different from client 1a as shown in FIG. 11 in that client 1c comprises update instruction means 115c in place of update instruction means 115, recording medium K1c in place of recording medium K1a, and further update instruction storing means 116.

Update instruction generating means 115c generates an update instruction for adding or renewing elements, on the basis of the user's updating operation on the update form and the update form data from server 2c. Update instruction generating means 115c also stores the generated update instruction into update instruction storing means 116 together with a storing order, and transfers the whole update instruction stored in update instruction storing means 116 together with the storing order to server 2c. Here, the storing order is indicated by "N" added to the parameter "path", "method" and "value", as shown in FIG. 17.

Recording medium K1c such as a magnetic disk, optical disk, semiconductor memory stores a computer readable program which implements transceiver means 12, update form acquiring means 114 and update instruction generating means 115b on client 1c.

Server 2c is different from server 2a as shown in FIG. 11, in that server 2c comprises data update means 23c in place of data update means 23 and recording medium K2c in place of recording medium 2Ka.

Data update means 23c is the same as data update means 23b as shown in FIG. 17.

Recording medium K2c such as a magnetic disk, optical disk, semiconductor memory stores a computer readable program which implements transceiver means 12, CGI 22, data update means 23c and form generating means 25 on server 2c.

Next, the operation of this embodiment is explained.

First, the user of client 1c starts up update form acquiring means 114 and inputs the XML identifiers of the XML data to be updated. Then, update form acquiring means 114 executes steps D1 to D3 as shown in FIG. 15, thereby displaying the update form as shown in FIG. 22 on display 14, in accordance with the update form generated by form generating means 25 in server 2c. The update form as shown in FIG. 22 comprises storage button 1410 which is not included in the update form as shown in FIG. 14.

When the update form as shown in FIG. 22 is displayed, the user of client 1c executes update operations by using the displayed update form.

Now, it is assumed that a new <member> SUZUKI Hanako is added in a first <department> as shown in FIG. 2. In this case, the user inputs "SUZUKI Hanako" into input box 1402 in the update form as shown in FIG. 22. Then, update instruction generating means 115c displays "SUZUKI Hanako" on input box 1402 (FIG. 23, H1). Here, step H1 is the same as step E1 as shown in FIG. 16. Then, the user clicks storage button 1410. Then, update instruction generating means 115c generates the following update instruction and stores it into update instruction storing means 116 (H2,H4). Here, update instruction generating means 115c adds "1" after "path", "method" and "value" such as "path1", "method1" and "value1", in order to indicate that these parameters are stored firstly. These parameters are described by the characters in input box 1402. The generated update instruction is stored in update storing means 116(H2, H4).

path1=/organization/department[1]/member[2]
method1=set
value1=SUZUKI Hanako

Further, it is assumed that a first <member> YAMAMOTO Taroh in a first <department> as shown in FIG. 2 is changed to "YAMADA Taroh". In this case, the user overwrites "YAMADA Taroh" on input box 1401. Then, update instruction generating means 115c displays "YAMADA Taroh" on input box 1401 (FIG. 16, E1).

Then, when the user clicks storage button 1410, update instruction generating means 115c generates the following update instruction and stores it into update instruction storing means 116 (H2, H4). Here, update instruction generating means 115c adds "2" after "path", "method" and "value" such as "path2", "method2" and "value2", each of which is described by the characters in input box 1401.

path2=/organization/department[1]/member[1]
method2=set
value2=YAMADA Taroh

Further, it is assumed that a <member> in a first <department> as shown in FIG. 2 is deleted. In this case, the user deletes, by using input means 13, the characters "YAMAMOTO Taroh" in input box 1401. Then, update instruction generating means 115c make input box 1401 vacant and change "value="set"" in element 1302 corresponding to input box 1401 to "value="remove"". Then, when the user clicks storage button 1410, update instruction generating means 115c generates the following update instruction and stores it into update instruction storing means 116 (H2, H4). Here, update instruction generating means 115c adds "3" after "path", "method" and "value" such as "path3", "method3" and "value3", each of which is described by the characters in input box 1401.

path3=/organization/department[1]/member[1]
method3=remove

Then, when the user clicks transmission button 1406, update instruction generating means 115c transfers to transceiver means 12 the above-explained three sets of instructions together with the XML identifiers (H3,H5).

Figure 20:
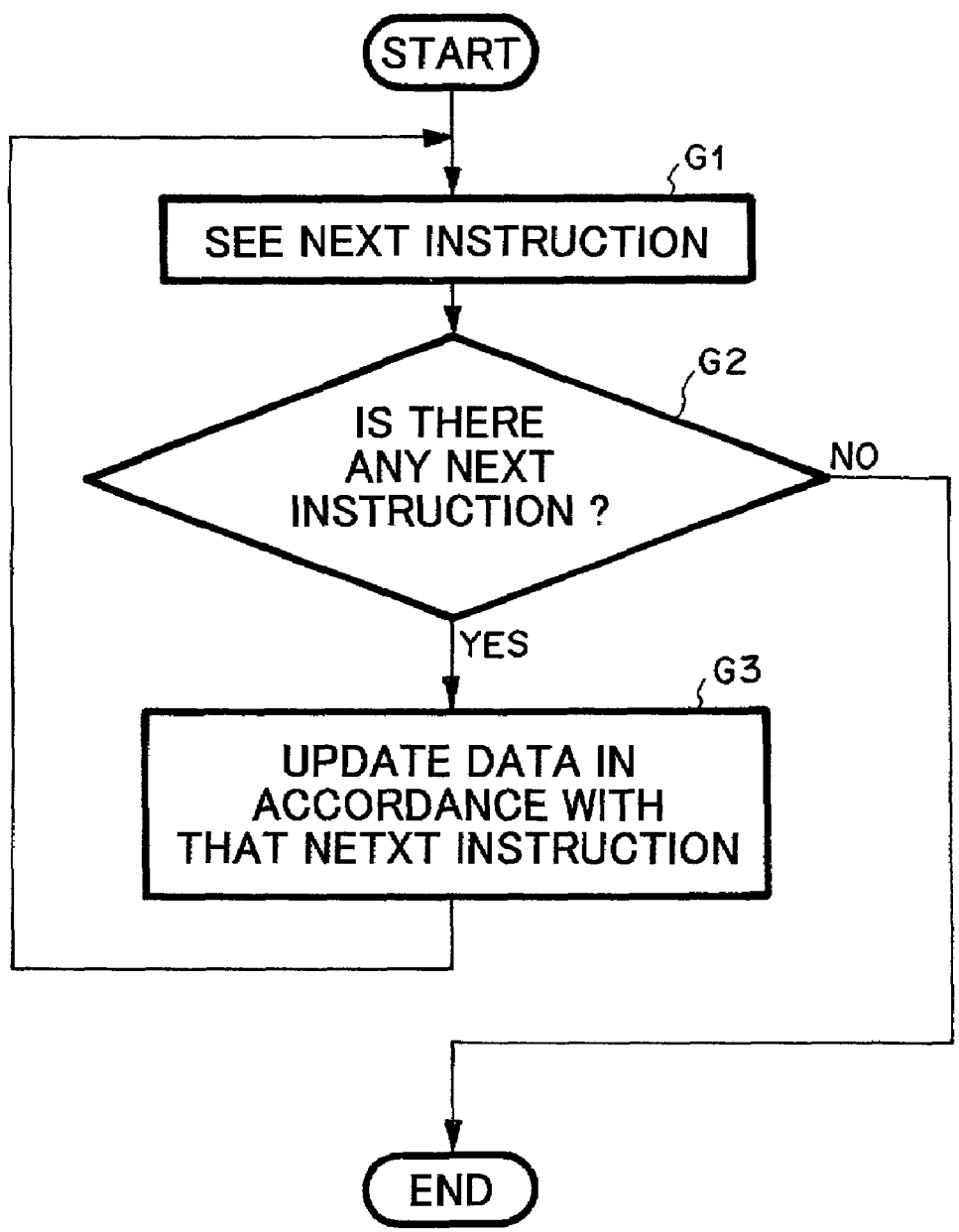
FIG. 20 is a flow chart for data update means 23b.

Transceiver means 12 transfers, to server 2c in accordance with HTTP, the three sets of instructions together with the XML identifier. The three sets of instructions are received by transceiver 21 in server 2b and transferred through CGI 22 to data update means 23c which executes the steps as shown in FIG. 20 in order to update the XML data.

What is claimed is:

1. A data update method using a system, said system including a server for storing XML data and a client connected to said server through a network, said method comprising:

transmitting from said client to said server an update instruction including a path, a method, and a value of an element to be updated in said XML data, said path including an arrangement of names of elements of said XML data to identify a location of said element to be updated in said XML data with respect to a hierarchical order of elements in said XML data; and updating in said server said element to be updated in accordance with said update instruction;

wherein, when there are two or more elements in said XML data with an identical name that are descendents of an identical parent element in said hierarchical order of elements in said XML data and said path includes a name of one of said two or more elements with the identical name, said path further includes an identifier to distinguish said name of said one of said two or more elements with the identical name from other elements with the identical name.

2. A data update method using a system, said system including a server for storing XML data and a client connected to said server through a network, said method comprising:

storing in said client a plurality of update instructions each of which includes a corresponding path, a corresponding method, and a corresponding value of a corresponding element to be updated in said XML data, said corresponding path of each of said plurality of update instructions including a corresponding arrangement of names of elements of said XML data to identify a location of said corresponding element to be updated in said XML data with respect to a hierarchical order of elements in said XML data;

storing in said client a stored order of each of said plurality of update instructions;

transmitting collectively said plurality of update instructions together with said stored order from said client to said server; and updating in said server said XML data in accordance with said plurality of update instructions in an order specified by said stored order;

wherein, when there are two or more elements in said XML data with an identical name that are descendants of an identical parent element in said hierarchical order of elements in said XML data and particular path of one of said plurality of update instructions includes a name of one of said two or more with the identical name, said particular path further includes an identifier to distinguish said name of said one of said two or more elements with the identical name from other elements with the identical name.

3. A data update system in which a server for storing XML data is connected through a network with a client, said system comprising:

update instruction means in said client for transmitting from said client to said server an update instruction including a path, a method, and a value of an element to be updated in said XML data, said path including an arrangement of names of elements of said XML data to identify a location of said element to be updated in said XML data with respect to a hierarchical order of elements in said XML data; and data update means in said server for updating said element to be updated in accordance with said update instruction;

wherein, when there are two or more elements in said XML data with an identical name that are descendants of an identical parent element in said hierarchical order of elements in said XML data and said path includes a name of one of said two or more elements with the identical name, said path further includes an identifier to distinguish said name of said one of said two or more elements with the identical name from other elements with the identical name.

4. The data update system according to claim 3, wherein said update instruction means comprises:

display means for displaying an update form including input boxes for inputting said path, said method, and said value of said update instruction; and update instruction generating means for transmitting to said server said update instruction inputted in said update form.

5. The data update system according to claim 3, wherein said update instruction means comprises:

update form acquiring means for displaying an update form including input boxes for inputting said path, said method, and said value, on the basis of update form data information for displaying said input boxes on the basis of said XML data and a prescribed template; and update instruction generating means for transmitting said update instruction to said server on the basis of the inputted update form and said update form data.

6. A data update system in which a server for storing XML data is connected through a network with a client, said system comprising:

update instruction means in said client for storing a plurality of update instructions, each of which includes a corresponding path, a corresponding method, and a corresponding value of a corresponding element to be updated in said XML data, and for storing in said client a stored order of each of said update instructions, and for transmitting collectively said plurality of update instructions together with said stored order to said server, said corresponding path of each of said plurality of update instructions including a corresponding arrangement of names of elements of said XML data to identify a location of said corresponding element to be updated in said XML data with respect to a hierarchical order of elements in said XML data; and data update means in said server for updating elements in said XML data in accordance with said plurality of update instructions in an order specified by said stored order;

wherein, when there are two or more elements in said XML data with an identical name that are descendants of an identical parent element in said hierarchical order of elements in said XML data and a particular path of one of said plurality of update instructions includes a name of one of said two or more elements with the identical name, said particular path further includes identifier to distinguish said name of said one of said two or more elements with the identical name from other elements with the identical name.

7. The data update system according to claim 6, wherein said update instruction means comprises:

update instruction storing means for storing said plurality of update instructions together with said stored order;

update form display means for displaying an update form including input boxes for inputting said corresponding path, said corresponding method, and said corresponding value of each of said plurality of update instructions; and update instruction generating means for transmitting collectively said plurality of update instructions together with said stored order to said server.

8. The data update system according to claim 6, wherein said update instruction means comprises:

update instruction storing means for storing said plurality of update instructions together with said stored order;

update form acquiring means for displaying an update form including input boxes for inputting said corresponding path, said corresponding method, and said corresponding value of each of said plurality of update instructions on the basis of update form data information for displaying said input boxes on the basis of said XML data and a prescribed template; and update instruction generating means for transmitting collectively said plurality of update instructions together with said stored order to said server.

9. A storage medium storing a computer program for a data update system in which a server computer for storing XML data is connected through a network with a client computer, said program causing:

said client computer to work as instruction means for transmitting from said client computer to said server computer an update instruction including a path, a method, and a value of an element to be updated in said XML data, said path including an arrangement of names of elements of said XML data to identify a location of said element to be updated in said XML data with respect to a hierarchical order of elements in said XML data; and said server computer to work as data update means for updating said element to be updated in accordance with said update instruction;

wherein, when there are two or more elements in said XML data with an identical name that are descendants of an identical parent element in said hierarchical order of elements in said XML data and said path includes a name of one of said two or more elements with the identical name, said path further includes an identifier to distinguish said name of said one of said two or more elements with the identical name from other elements with the identical name.

10. A storage medium storing a computer program for a data update system in which a server computer for storing XML data is connected through a network with a client computer, said program causing:

said client computer to work as update instruction means for storing a plurality of update instructions, each of which includes a corresponding path, a corresponding method, and a corresponding value of a corresponding element to be updated in said XML data, and for storing a stored order of each of said plurality of update instructions, and for transmitting to said server computer collectively said plurality of update instructions together with said stored order, said corresponding path of each of said plurality of update instructions including a corresponding arrangement of names of elements of said XML data to identify a location of said corresponding element to be updated in said XML data with respect to a hierarchical order of elements in said XML data; and said server computer to work as data update means for updating elements in said XML data in accordance with said plurality of update instructions in an order specified by said stored order;

wherein, when there are two or more elements in said XML data with an identical name that are descendants of an identical parent element in said hierarchical order of elements in said XML data and a particular path of one of said plurality of update instructions includes a name of one of said two or more elements with the identical name, said particular path further includes an identifier to distinguish said name of said one of said two or more elements with the identical name from other elements with the identical name.

* * * * *